United States Patent
Claesson et al.

(10) Patent No.: US 10,323,850 B2
(45) Date of Patent: Jun. 18, 2019

(54) METHOD AND DEVICE FOR DEHUMIDIFICATION

(71) Applicant: CORROVENTA AVFUKTNING AB, Bankeryd (SE)

(72) Inventors: Knut Claesson, Gränna (SE); Anders Lindelöw, Mullsjö (SE); Johan Edström, Bottnaryd (SE); Marcus Malmström, Nässjö (SE); Per Ekdahl, Bankeryd (SE)

(73) Assignee: Corroventa Avfuktning AB, Bankeryd (SE)

( * ) Notice: Subject to any disclaimer, the term of this patent is extended or adjusted under 35 U.S.C. 154(b) by 81 days.

(21) Appl. No.: 15/501,776

(22) PCT Filed: Jul. 29, 2015

(86) PCT No.: PCT/SE2015/050837
§ 371 (c)(1),
(2) Date: Feb. 3, 2017

(87) PCT Pub. No.: WO2016/022056
PCT Pub. Date: Feb. 11, 2016

(65) Prior Publication Data
US 2017/0227241 A1  Aug. 10, 2017

Related U.S. Application Data

(63) Continuation of application No. PCT/SE2015/050837, filed on Jul. 29, 2015.

(30) Foreign Application Priority Data

Aug. 5, 2014  (SE) ..................... 1450924

(51) Int. Cl.
*F24F 3/14* (2006.01)
*B01D 53/26* (2006.01)
(Continued)

(52) U.S. Cl.
CPC .......... *F24F 3/044* (2013.01); *B01D 53/0454* (2013.01); *B01D 53/06* (2013.01);
(Continued)

(58) Field of Classification Search
CPC .... F24F 11/00; F24F 3/044; F24F 2203/1032; B01D 53/26; B01D 53/06; B01D 2259/40098
(Continued)

(56) References Cited

U.S. PATENT DOCUMENTS 5,147,420 A * 9/1992 Claesson .............. B01D 53/261
 95/113
5,474,594 A  12/1995 Khelifa et al.
(Continued)

FOREIGN PATENT DOCUMENTS

JP  2006-234193 A * 9/2006
WO  9611049 A1  4/1996

OTHER PUBLICATIONS

Machine generated English translation of JP 2006-234193 A, published Sep. 2006.*
(Continued)

*Primary Examiner* — Frank M Lawrence, Jr.
(74) *Attorney, Agent, or Firm* — Perkins Coie LLP

(57) ABSTRACT

A dehumidifier for air is provided. The dehumidifier includes a housing with an inlet for process air, an outlet for process air, and an opening for regeneration air. The dehumidifier includes a dehumidification element, a fan for bringing process air to flow through at least a first portion of the dehumidification element, and a heating element to heat a part of process air flowing through the dehumidification element for regeneration of the dehumidification element by using the heated process air. A controller controls the amount of air that flows though the outlet for process air and the (Continued)

opening for regeneration air and the sensor/meter to calculate consumed power for the heating element, wherein the heating element is a PTC heater. The controller allows a user in a simple way to adjust the operating parameters to a desired operating mode.

7 Claims, 5 Drawing Sheets

(51) Int. Cl.
*F24F 3/044* (2006.01)
*B01D 53/06* (2006.01)
*B01D 53/04* (2006.01)
*F24F 11/00* (2018.01)

(52) U.S. Cl.
CPC ........... *B01D 53/26* (2013.01); *B01D 53/261* (2013.01); *F24F 3/1423* (2013.01); *F24F 11/00* (2013.01); *B01D 2253/106* (2013.01); *B01D 2253/108* (2013.01); *B01D 2259/4009* (2013.01); *B01D 2259/40096* (2013.01); *F24F 2203/1032* (2013.01)

(58) Field of Classification Search
USPC ................. 95/1, 14, 23, 113, 117, 123, 148; 96/109, 110, 112, 125; 34/80, 472, 473
See application file for complete search history.

(56) References Cited

U.S. PATENT DOCUMENTS

| | | | |
|---|---|---|---|
| 5,938,523 A * | 8/1999 | Khelifa | B60H 3/0633 454/156 |
| 2014/0190658 A1 * | 7/2014 | Park | B60H 3/024 165/8 |

OTHER PUBLICATIONS

Extended European Search Report for European Application No. 15830162.2, dated Jul. 17, 2017, 8 pages.

* cited by examiner

METHOD AND DEVICE FOR DEHUMIDIFICATION

TECHNICAL FIELD

The present invention relates generally to a method and an apparatus for dehumidification of air and more specifically to a method and an apparatus wherein a so-called PTC heater is used.

BACKGROUND ART

SE462583 describes a method and an apparatus for dehumidification of air wherein process air is dehumidified through passing a drying rotor comprising moisture adsorbing means. In order to reach high temperatures radiation heat is used from a heating element, for example a radiator, for regeneration of a rotor by means of an adsorption means.

During dehumidification the user can have different requests regarding what to be obtained: for example to remove water as energy efficiently as possible, to remove as much water as possible per time unit or to create air with as low vapour content as possible. These different requests, or operation modes, require different parameter settings of the dehumidification device. These parameter settings may relate to the rotational speed of the fan or fans transporting air through the dehumidifier, power input to the heating element, distribution of incoming air between outgoing dry air and regeneration air etc.

A technician with long experience can finally learn approximate settings which give a desired operation mode, but even such experienced technicians may not always set optimum values for the operation parameters.

One kind of heating element is the so-called PTC heater, where PTC stands for Positive Temperature Coefficient. These heating elements have the feature that the power they deliver depends on the amount of air flowing by, i.e., the air velocity, as well as the temperature of the air flowing by. This means for example that a PTC heater wherein no air flows by outputs essentially no power.

SUMMARY OF INVENTION

An object of the present invention is to provide a method and a dehumidification apparatus wherein a user in a simple way can adjust the operating parameters to a desired operation mode.

The invention is based on the realization that by measuring used power of a heater in a dehumidification apparatus it is possible to in an easy way optimize the operation parameters depending on the desired operation mode.

According to a first aspect of the invention there is provided a method for dehumidification of air, comprising the following steps: bringing damp process air to flow past a first portion of a dehumidification element to leave the dehumidification element as dried process air, heating a part of the dried process air by means of a heating element to provide regeneration air, bringing the heated regeneration air to flow past a second portion of the dehumidification element to regenerate this, wherein the method is characterized by adjusting the amount per time unit of dried process air and heated regeneration air as a function of a power consumption of the heating element and using a PTC heater as the heating element.

According to a second aspect of the invention there is provided an apparatus for dehumidification of air, comprising: a housing provided with an inlet for process air, an outlet for process air and an opening for regeneration air, a dehumidification element, a fan for bringing process air to flow through at least a first portion of the dehumidification element, a heating element adapted to heat a part of process air flowing through the dehumidification element for regeneration of the dehumidification element by means of the heated process air, wherein the apparatus is characterized by control means adapted to control the amount of air that flows though the outlet for process air and the opening for regeneration air and means adapted to calculate consumed power for the heating element, wherein the heating element is a PTC heater.

Preferred embodiments are defined by the appended dependent claims.

BRIEF DESCRIPTION OF DRAWINGS

The invention is now described, by way of example, with reference to the accompanying drawings, in which.

DESCRIPTION OF EMBODIMENTS

In the following, a detailed description of embodiments will be given.

Figure 1:
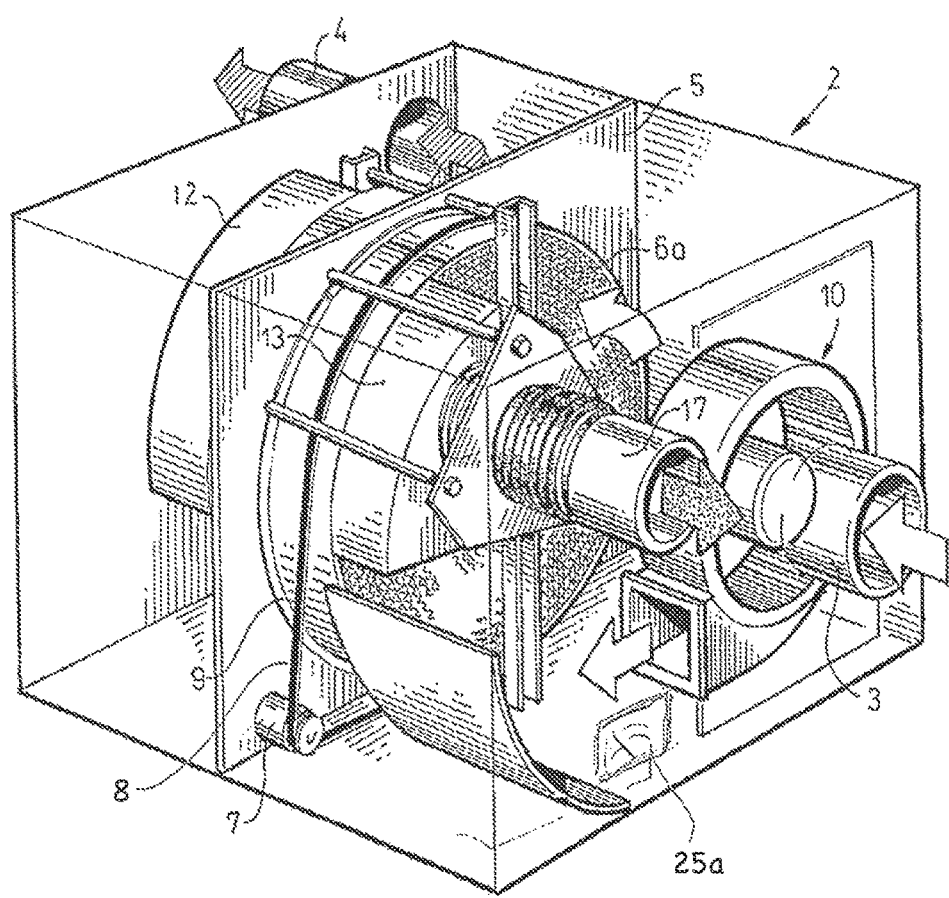
FIG. 1 is a perspective view of an air dryer or dehumidifier according to the invention, wherein the housing of the dehumidifier is assumed to be transparent for the sake of illustration so that the different components of the dehumidifier are visible.
Figure 2:
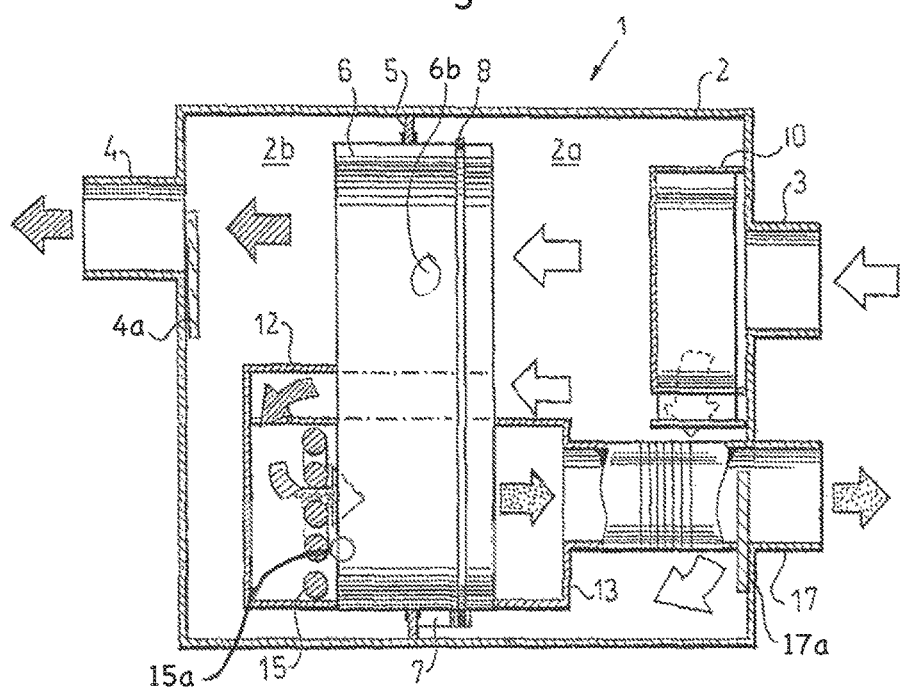
FIG. 2 is a vertical section though the dehumidifier of FIG. 1.

With reference to FIGS. 1 and 2 a dehumidifier comprises a housing 2 provided with an inlet 3 for process air and an outlet 4 for process air. A partition wall 5 is provided in the housing 2 exhibiting a circular hole housing a rotor 6, the journaling of which is not shown in the figures. The rotor is driven by an electrical motor 7, directly or indirectly via a belt 8, for example, as shown in the figure. The rotor is provided with a suitable sealing 9 sealing the rotor against the partition wall 5.

The rotor 6 exhibits a large number of passages 6a, in which a desiccant, for example silica gel, a molecular sieve or the like is provided, whereby an almost infinite regeneration of the rotor is possible.

Adjacent to the inlet 3 there is provided a fan 10, such as a centrifugal fan, adapted to draw damp air, in the following referred to as process air, into the inlet 3. The speed of the fan can be controlled by means of a potentiometer or the like between a lowest speed and a highest speed, whereby the amount of drawn process air can be controlled in dependence of a desired operating mode. As an alternative to step-less control, the speed of the fan can be controlled between the lowest and the highest speeds by means of a switch, for example.

The fan creates an overpressure in the part 2a of the housing which is provided adjacent to the partition wall 5. The process air which has been drawn in and been pressurized by the fan 10 flows through the rotor 6 and is dehumidified and preheated therein. The major part of this flow of process air flows into a chamber 2b provided on the other side of the partition wall 5 and leaves the dehumidifier through the outlet 4 for process air. This dried process air is returned for example to a moisture damage or to another process wherein air with a low moisture content is used.

A minor part of the air that flows through the rotor 6, for example one fifth of the incoming flow of process air, is captured by a first cover 12, preferably made of aluminium or other heat resistant material, which is mounted on the low pressure side of the rotor 6. The first cover 12 has the shape of a circle sector except the portion corresponding to the rotor axle. A corresponding second cover 13 is provided on the high pressure side of the rotor 6.

As previously mentioned a part, in one embodiment 20%, of the process air flowing through the rotor is captured by the first cover and this deflected air, the regeneration air, is heated by a heating element 15 in the form of a PTC heater provided in the first cover 12. The heating element is thus adapted to heat air flowing by and which then flows though the rotor and heats this, whereby moisture captured by the desiccant is removed by the regeneration air and is bound thereto, whereafter the damp regeneration air leaving the rotor is captured by the second cover 13 and is guided from the dehumidifier though an opening 17 for regeneration air.

A temperature sensor 15a can be provided in close proximity to and preferably downstream of the heating element 15 for measuring of the temperature up to which the heating element heats the air flowing by. In addition to or alternatively a flow sensor 6b may be provided for measuring the air flow through the rotor. These parameters are used for adjusting the dehumidifier, as will be described below.

Both the outlet 4 for process air and the opening 17 for regeneration air are provided with constriction or throttle means 4a and 17a, respectively, by means of which the amount of air passing through these openings can be controlled. The constriction means may be sliding discs by means of which a variable part of the outlet for process air and the opening for regeneration air, respectively, is covered. In this way the operating mode of the dehumidifier may be controlled, as will be described in more detail hereinbelow.

Figure 3:
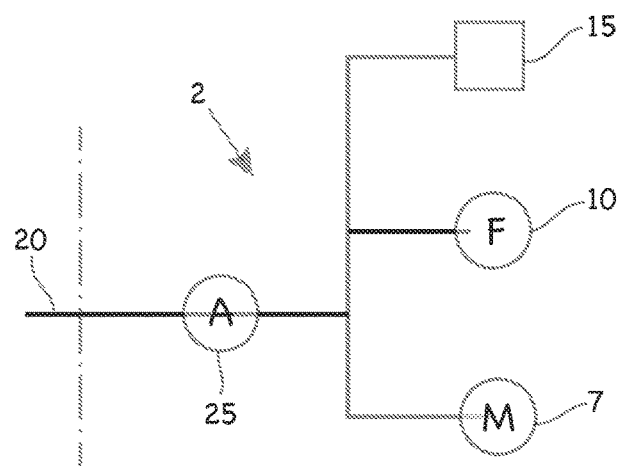
FIG. 3 shows an electric diagram of the parts of a dehumidifier according to the invention.

Reference is now made to FIG. 3 showing an electrical diagram of the dehumidifier 2. Both the heating element 15 and the motor 7 and the fan 10 are driven by electricity supplied though an external wire 20 adapted for connection to a wall outlet or similar connection means. The current conducted by the wire 20 is measured by means of an ampere meter 25 and is displayed by means of a pointer on a display 25a, see FIG. 1. It should be noted that the power consumed by the fan 10 and the motor 7 during operation is essentially negligible compared to the power consumed by the heating element 15, for which reason it can be assumed that the ampere meter 25 essentially measures the current consumed by this heating element. For additional accuracy the ampere meter can of course be placed so that it only measures the current flowing to the heating element 15.

Figure 4:
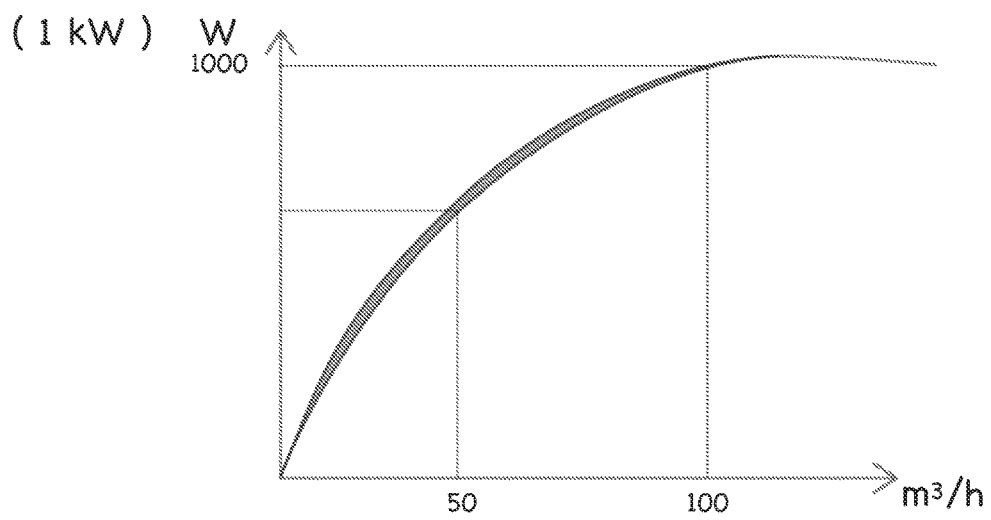
FIG. 4 is a curve diagram showing the relationship between consumed power and the amount of air flowing past a PTC heater at a given temperature of the air.

It was initially mentioned that PTC heaters consume power in dependence of the amount of air flowing by. In FIG. 4 there is shown an example of the relationship between the amount of air flowing by, shown on the x axis as the number of cubic meters of air per hour, and the power delivered by the heating element, expressed in Watts shown on the y axis. It is then seen that the power delivered increases asymptotically towards the maximum power when the air flow increases.

Figure 5:
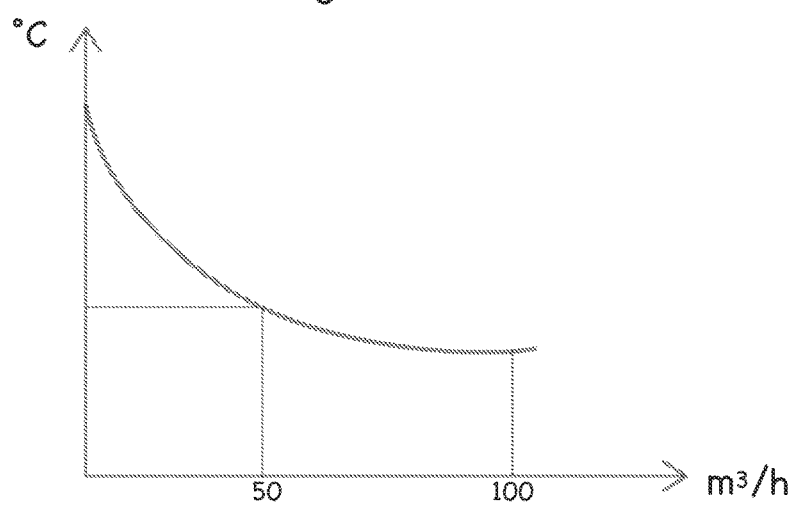
FIG. 5 is a curve diagram showing the relationship between temperature and the amount of air flowing past a PTC heater.

In FIG. 5 there is shown an example of the relationship between the amount of air flowing by, shown on the x axis as the number of cubic meters of air per hour, and the temperature to which the heating element heats the air flowing by, expressed in Centigrades on the y axis. With a very small amount of air this air can be heated to a higher temperature while a large amount of air flowing by leads to lower temperatures.

The principle behind a method of dehumidifying air according to the invention will now be descried in detail.

Initially it was mentioned that the user of a dehumidifier can have different requests regarding what to be obtained:
  to remove water as energy efficiently as possible,
  to remove as much water as possible per time unit or
  to create air with as low vapour content as possible.

From the two curves in FIGS. 4 and 5, the operating points which give optimum operation given the requests relating to operating mode from the user can be found. Hereby the PTC heater 15 can also be given a size to that a desired performance is obtained. Alternatively, this can be derived through a large number of measurements.

These operating modes are obtained in accordance with the following, wherein reference is made to the description above of a dehumidifier according to the invention.

In the first operating mode, i.e., when you want to remove water as energy efficiently as possible, the constriction means 4a and 17a are adjusted to minimum constriction and the speed of the fan 10 is adjusted to maximum speed, so that a throughput through the dehumidifier of the largest volume of process air per time unit is obtained. Maximum air throughput, designated 100 on the x axes of FIGS. 4 and 5, is then arrived at. This is not an optimum with regard to energy consumption and subsequently the opening 17 for regeneration air is therefore constricted by means of the throttle 17a, whereby a smaller part of the dried process air is used as regeneration air. This in turn leads to a smaller amount of air flowing past the PTC heater 15, moving the operating point to the left in the diagrams of FIGS. 4-5. The constriction of the opening 17 for regeneration air is controlled until an optimum operating point with regard to energy use is obtained.

Figure 6A:
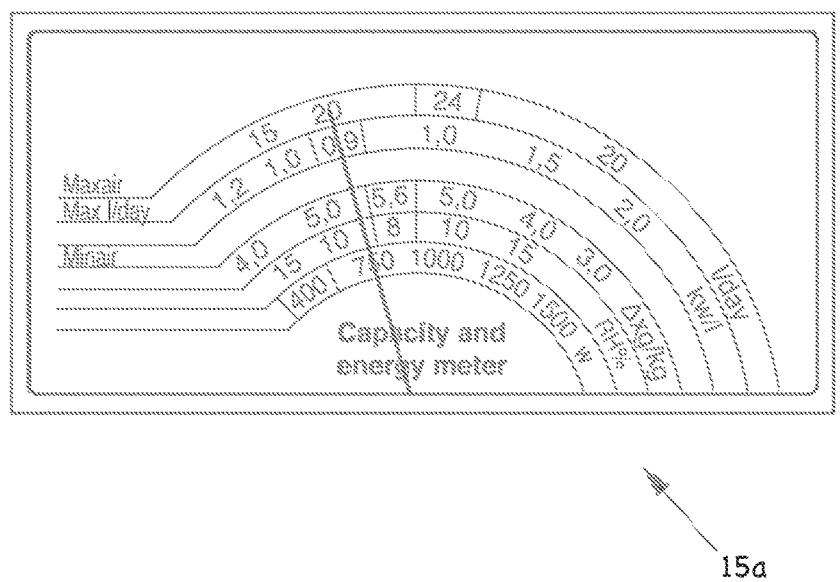
FIG. 6a is an example of an analogue meter used for showing optimum operating parameters based on consumed power of the PTC heater.
Figure 6B:
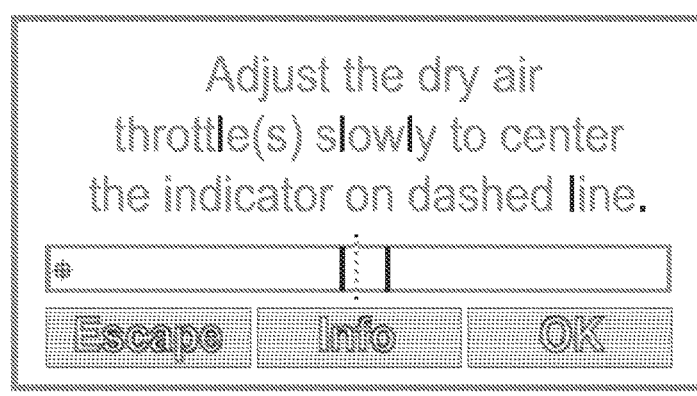
FIG. 6b is an example of a digital meter used for showing optimum operating parameters based on consumed power of the PTC heater.

An optimum operating point for the current operating mode is a function of the power consumption of the PTC heater. Information regarding this is obtained from the current value measured by the ampere meter 25 and which is shown with the pointer on the display 25a. An example of such a display is shown in FIG. 6a. It is here realized that the display is provided with three scales: one for each operating mode. Each scale has a range with deviant background colour showing that optimum operating parameters have been set for the current operating mode. The regulation by means of throttles is thus performed with support of the position of the display pointer; the opening of the throttle is increased or decreased until the pointer has a position within the range designating optimum operating mode.

In the second operating mode, i.e., when you want to remove as much water as possible per time unit, the constriction means 4a and 17a are adjusted to minimum constriction and the speed of the fan 10 is adjusted to maximum speed, so that a throughput through the dehumidifier of the largest volume of process air per time unit is obtained. You then arrive at maximum air throughput, designated 100 on the x axes of FIGS. 4 and 5. However, what you want is maximum volume of process air per time unit leaving the dehumidifier 2 though the outlet 4 for process air. This is obtained by subsequently constricting the opening 17 for regeneration air by means of the throttle 17a, whereby a smaller part of the dried process air is used as regeneration air. This in turn leads to a higher amount of process air per time unit exiting the dehumidifier through the outlet 4 for process air, i.e., as much water as possible is removed per time unit. The constriction of the opening 17 for regeneration air is controlled until an optimum operating point with regard to exiting process air. In the same way as during the setting in the first operating mode the display is used as a support for setting but instead the scale for the second operating mode is used instead of that of the first operating mode.

Like in the first operating mode, in the second operating mode reference is made to an operating point with regard to the power consumption across the heater. This point is not optimal in normal regard. More water can be removed by further increasing the amount of regeneration air but soon a position is reached wherein you gain relatively little in the form of increased amount of removed water compared to the increased power consumption required by this.

In the third operating mode, i.e., when you want to create as low moisture content/vapour pressure as possible in the exiting air, the constriction means 4a and 17a are adjusted to minimum constriction and the speed of the fan 10 is controlled to minimum speed. Subsequently, the outlet 4 for process air is constricted by means of the throttle 4a in order to further decreasing the amount of process air per time unit, until an optimum operating point with regard to the degree of dehumidification. Like during the setting in the first and second operating modes, the display is used as a support for the setting but instead you look at the scale for the third operating mode.

Alternatively, you can operate both throttles but the normal is to constrict on the dry air side for forcing more air on the regeneration side to thereby increase the regeneration power despite a relatively small amount of air in total in the system. Alternatively, you a number of sub-modes can be used in this operating mode with different fan speeds to deliver the required amount of air, i.e., there is not one single lowest speed.

In an alternative embodiment, the ampere meter described above is replaced by the above described temperature sensor 15 and a flow sensor 6b, which are connected to a calculation unit, such as a computer.

Figure 7:
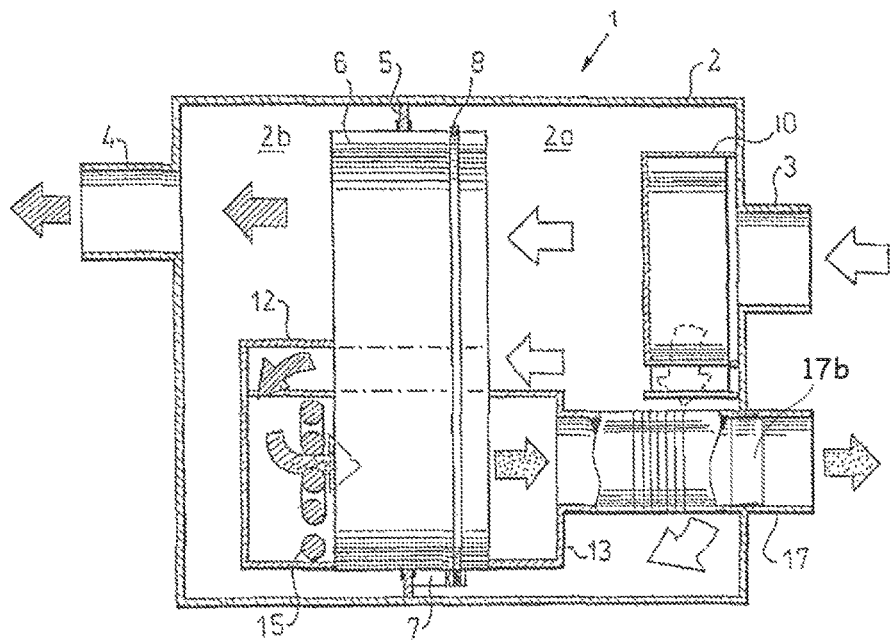
FIG. 7 shows a vertical section through an alternative embodiment of a dehumidifier provided with an arrangement of twin fans and FIG. 8 shows a diagram of the parts of the dehumidifier that are used for controlling the amount of air in the dehumidifier.

In FIG. 7 there is shown an alternative embodiment of an apparatus for dehumidification of air, which to a large extent is similar to the one described above with reference to FIGS. 1 and 2. Thus, it comprises an inlet 3 for process air and an outlet 4 for process air. A partition wall 5 is provided in the housing 2 exhibiting a circular hole housing a rotor 6 as described above and which is driven by an electrical motor 7. Adjacent to the inlet 3 there is provided a fan 10, such as a centrifugal fan, adapted to draw damp air, in the following referred to as process air, into the inlet 3. The fan creates an overpressure in the part 2a of the housing which is provided adjacent to the partition wall 5. The process air which has been drawn in and been pressurized by the fan 10 flows through the rotor 6 and is dehumidified and preheated therein. The major part of this flow of process air flows into a chamber 2b provided on the other side of the partition wall 5 and exits the dehumidifier through the outlet 4 for process air. This dried process air is returned for example to a moisture damage or to another process wherein air with a low moisture content is used.

A minor part of the air that flows through the rotor 6 is captured by a first cover 12, which is mounted on the low pressure side of the rotor 6 and which has the shape of a circle sector except the portion corresponding to the rotor axle. A corresponding second cover 13 is provided on the high pressure side of the rotor 6.

The regeneration air is heated, as in the above described embodiment, by a heating element 15 in the form of a PTC heater 15 provided in the first cover 12 and the damp regeneration air leaving the rotor is captured by the second cover 13 and is guided from the dehumidifier though an opening 17 for regeneration air. This opening for regeneration air is provided with a second fan 17b, by means of which regeneration air is sucked out from the dehumidifier. Alternatively, the air can be pressed out.

The outlet 4 for process air as well as the opening 17 for regeneration air are provided with a constriction means 4a and 17a, respectively, by means of which the amount of air flowing through these openings can be controlled.

In addition to or as an alternative to the controlling of the amount of air provided by means of the constriction means, the first fan 10 drawing damp air and/or the second fan 17b drawing out regeneration air may be controllable. In other words, the amount of air may be controlled by changing the cross sectional area of the flow path and/or by adjusting the fan speed.

Figure 8:
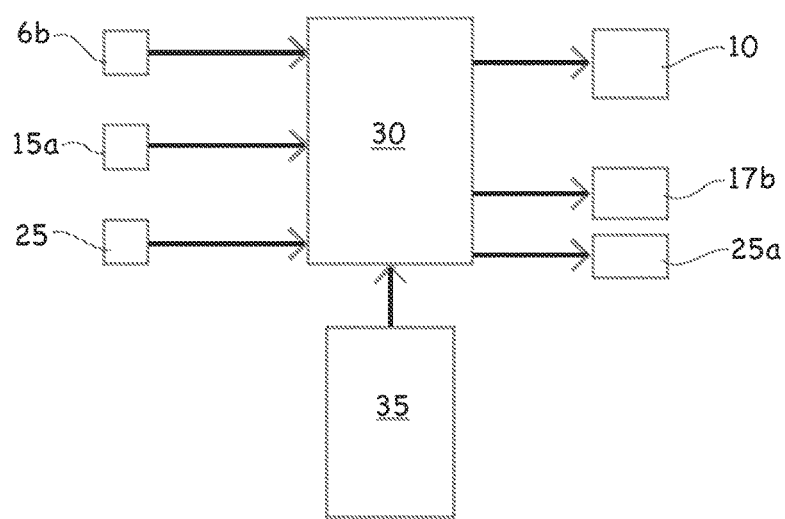

In FIG. 8 an example of an electrical diagram is shown showing the parts of the dehumidifier used during controlling of the amount of air flowing in the dehumidifier. The flow sensor 6b and the temperature sensor 15a and/or the ampere meter 25 are thus connected to a calculation unit 30, such as a micro processor. Based on the information of desired operating mode, which can be input through an input unit 35, which may be a keyboard, a set of switches etc. an optimum operation of the fan 10 for process air and/or the fan 17b for regeneration air is calculated. Current operating mode is shown on the display 25a.

Preferred embodiments of the invention have been described. It will be realized that these can be varied within the scope of the appended claims without departing form the inventive idea.

Although this invention has been described in connection with dehumidification it will be realized that the apparatus can also be used in other application areas.

The invention claimed is:

1. A method for dehumidification of air, comprising the following steps:
   bringing damp process air to flow past a first portion of a dehumidification element to leave the dehumidification element as dried process air,
   heating a part of the dried process air by means of a heating element to provide regeneration air,
   bringing the heated regeneration air to flow past a second portion of the dehumidification element to regenerate this,
   characterized by
   adjusting the amount per time unit of dried process air and heated regeneration air as a function of a power consumption of the heating element and
   using a PTC heater as the heating element.

2. The method according to claim 1, wherein the amount per time unit of dried process air and heated regeneration air is adjusted according to at least one of the following three modes:

removing water as energy efficiently as possible,
removing as much water as possible per time unit and
creating air with as low vapour content as possible.

3. The method according to any one of claims 1-2, wherein, to remove water as energy efficiently as possible, the following steps are performed:

maximizing the flow area for dried process air and regeneration air and maximizing throughput of damp process air and subsequently decreasing the flow area for regeneration air until reaching optimum operation point with regard to removing water as energy efficiently as possible.

4. The method according to any one of claims 1-2, wherein, to remove as much water as possible per time unit, the following steps are performed:

maximizing the flow area for dried process air and regeneration air and maximizing throughput of damp process air and subsequently decreasing the flow area for regeneration air until reaching optimum operation point with regard to removing as much water as possible per time unit.

5. The method according to any one of claims 1-2, wherein, to create air with as low vapour content as possible, the following steps are performed:

maximizing the flow area for dried process air and regeneration air and minimizing throughput of damp process air and subsequently decreasing the flow area for dried process air until reaching optimum operation point with regard to creating air with as low vapour content as possible.

6. An apparatus for dehumidification of air, comprising:
a housing (2) provided with an inlet (3) for process air, an outlet (4) for process air and an opening (17) for regeneration air,
a dehumidification element (6),
a fan (10) for bringing process air to flow through at least a first portion of the dehumidification element,
a heating element (15) adapted to heat a part of process air flowing through the dehumidification element for regeneration of the dehumidification element by means of the heated process air,
characterized by
control means (4a, 10, 17a, 17b) adapted to control the amount per time unit of air that flows though the outlet (4) for process air and the opening (17) for regeneration air as a function of a power consumption of the heating element and
means (6b, 15a; 25) adapted to calculate consumed power for the heating element,
wherein the heating element (15) is a PTC heater.

7. An apparatus for dehumidification of air, comprising:
a housing (2) provided with an inlet (3) for process air, an outlet (4) for process air and an opening (17) for regeneration air,
a dehumidification element (6),
a fan (10) for bringing process air to flow through at least a first portion of the dehumidification element,
a heating element (15) adapted to heat a part of process air flowing through the dehumidification element for regeneration of the dehumidification element by means of the heated process air,
characterized by
control means (4a, 10, 17a, 17b) adapted to control the amount of air that flows though the outlet (4) for process air and the opening (17) for regeneration air and
means (6b, 15a; 25) adapted to calculate consumed power for the heating element,
wherein the heating element (15) is a PTC heater, wherein the means (6b, 15a; 25) adapted to calculate consumed power for the heating element are adapted to calculate total consumed power for the apparatus, wherein consumed power for the heating element is approximated to total consumed power for the apparatus.

* * * * *